(12) United States Patent
Burlet

(10) Patent No.: US 7,882,678 B1
(45) Date of Patent: Feb. 8, 2011

(54) POPCORN BASED CONSTRUCTION MATERIAL AND METHOD FOR MAKING THE SAME

(76) Inventor: Mathias Burlet, 210 NE. 102nd St., Miami Shores, FL (US) 33138

(*) Notice: Subject to any disclaimer, the term of this patent is extended or adjusted under 35 U.S.C. 154(b) by 210 days.

(21) Appl. No.: 11/422,894

(22) Filed: Jun. 8, 2006

(51) Int. Cl.
*E04C 2/54* (2006.01)
(52) U.S. Cl. .................. 52/783.1; 52/742.1; 52/DIG. 9
(58) Field of Classification Search ............... 52/783.1, 52/742.1, DIG. 9
See application file for complete search history.

(56) References Cited

U.S. PATENT DOCUMENTS 2,649,958 A * 8/1953 Rausch ..................... 206/584
2,972,559 A * 2/1961 Allen et al. ................. 156/322
3,229,814 A * 1/1966 Cowamn .................... 206/585
3,511,899 A * 5/1970 Bach et al. .................. 264/460
5,091,201 A * 2/1992 Murata et al. .............. 426/285

* cited by examiner

*Primary Examiner*—Brian E Glessner
*Assistant Examiner*—James J Buckle, Jr.
(74) *Attorney, Agent, or Firm*—Malin Haley DiMaggio Bowen & Lhota, P.A.

(57) ABSTRACT

Popcorn based composite construction material to be used as interior or exterior non-load bearing walls, partitions or roof sections for buildings comprising a plurality of popped kernels of popcorn, a hydrating liquid to moisten the popcorn kernels, a dry powder material applied to the moistened popcorn kernels through powder coating, and an impermeable and adhesive resin applied on the powder coated popcorn kernels.

11 Claims, 3 Drawing Sheets

POPCORN BASED CONSTRUCTION MATERIAL AND METHOD FOR MAKING THE SAME

BACKGROUND OF THE INVENTION

1. Field of the Invention

The present invention relates to materials for constructing exterior and interior building non-load bearing walls, roofs and partitions and the method of making that includes the use of popped corn kernels.

2. Description of Related Art

Currently, the construction of buildings and other structures primarily use concrete, which combines Portland cement, gravel and water for both load bearing and non-load bearing exterior walls. Concrete is quite heavy and has become very expensive per yard. Further still, in locations which are not rich in raw materials, the materials must be shipped to a building site, which is expensive and may be time consuming. Also, a great deal of water is required to make concrete and some remote locations may not have such access to water. Concrete blocks and bricks are also used for exterior building walls. Again, the materials are heavy and expensive and require extensive labor to construct.

It is desired that construction of buildings could be completed using a material composed of inexpensive and widely available resources. Further, strong, lightweight materials would allow builders to construct buildings on a wider array of structures and locations.

SUMMARY OF THE INVENTION

A molded wall for a building wall panel, partition or roof section comprising popped kernels of corn, briefly dipped in a moistening agent, such as a solution of resin and thinner, and immediately powdered with Portland cement or bauxite. However, any dry powder that has a binding quality will be effective. The cement coated popped kernels are then again coated with a resin material to make the composition impermeable and adhesive. The popcorn composition is then placed in a mold to form a flat wall structure several inches thick, approximately four feet by eight feet as an example. The molded wall unit can be used as an exterior (or interior) building wall fixed in place between vertical support members that are used to give structural rigidity to the building. Typical vertical support members are poured concrete vertical posts, welded I beams in large tall buildings or other known construction members to form a vertical building support structure. The molded composite popcorn based material can be used as wall panels, partitions, and roof panels in residential or commercial buildings. When the composition is placed in the mold, the mold is vibrated, so as to further settle the popcorn and other materials and reduce as much unnecessary pockets of air as possible. The popcorn wall composition is then allowed to dry and harden. A non-load bearing wall (interior or exterior) of a building can be constructed with planar shaped molds.

As an alternative, the individual popped kernels of popcorn may be moistened with a liquid, then powder coated, then covered with resin and allowed to dry. After the popcorn is allowed to dry and harden, they may be added to a solution of cement and sand. The popcorn will provide a substitute for gravel, which is normally used in cement.

It is an object of the present invention to provide a new composite construction material for buildings that has significant structural rigidity and remains substantially lightweight.

It is a further object of the present invention to provide a new construction material for buildings that uses natural and renewable resources that do not harm the environment.

It is a further object of the present invention to provide a new construction material that is a substitute for concrete.

It is a further object of the present invention to provide a new construction material that is non-flammable.

It is yet a further object of the present invention to provide a new construction material that is impermeable to moisture and insects.

It is yet a further object of the present invention to provide a new construction material that has high structural strength and is not susceptible to mold growth.

It is yet a further object of the present invention to provide a new construction material that is less dense than water to provide floatation if needed.

It is yet a further object of the present invention to provide a new construction material that maintains air pockets throughout the material and thus, provides insulation to the structure which it has formed.

In accordance with these and other objects which will become apparent hereinafter, the instant invention will now be described with particular reference to the accompanying drawings.

DETAILED DESCRIPTION

Figure 1:
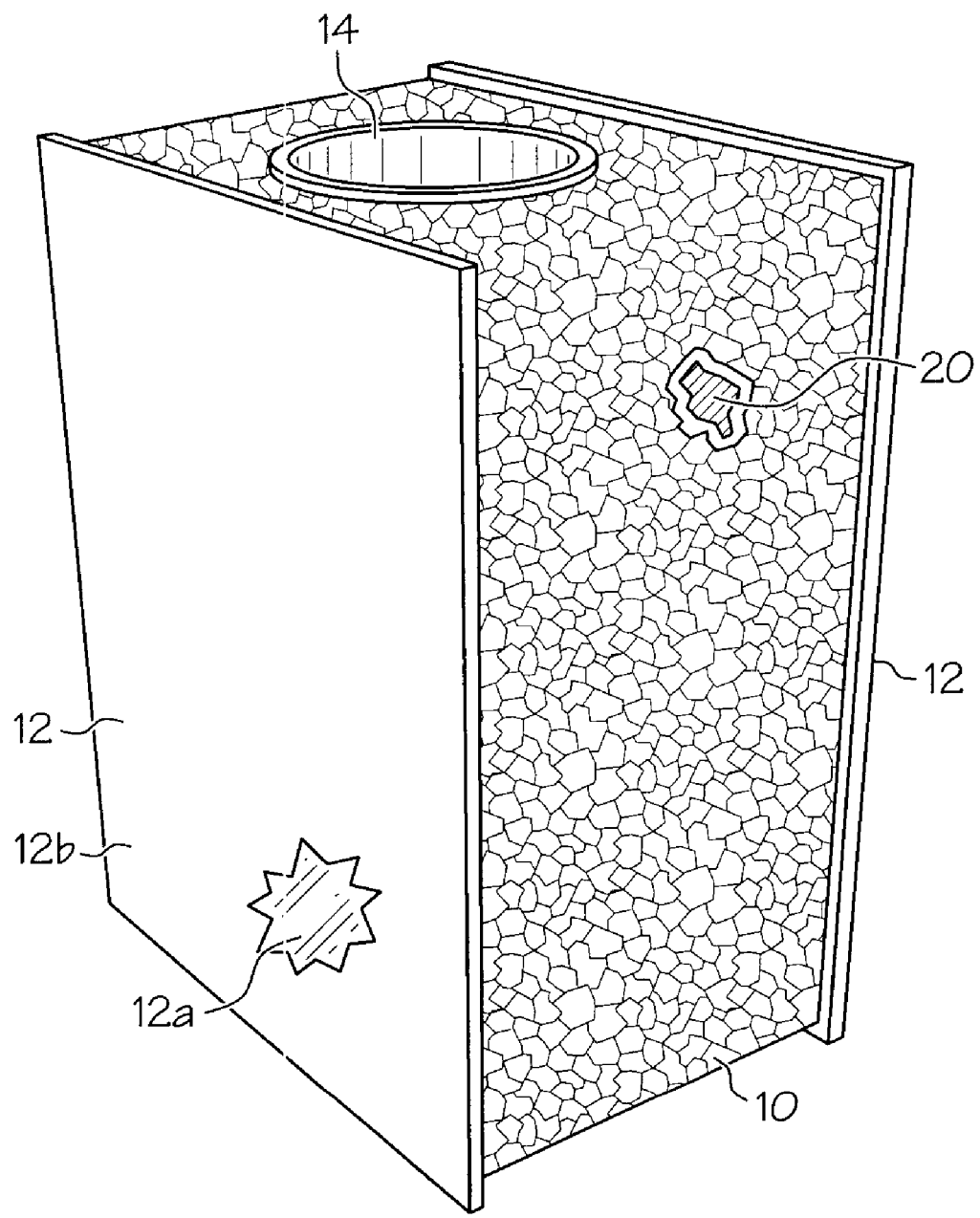
FIG. 1 shows a perspective view of the popcorn based construction material contained between two sidewalls to create a wall panel.

In reference to FIG. 1, a perspective view of the popcorn based composite construction material 10 contained between two sidewalls 12 as a laminate is shown. FIG. 1 shows a cutaway portion to show the resin and fiberglass interior 12a and the gelcoat exterior 12b layer. The sidewalls 12 are molded and adhere to the composite material 10 to form a wall unit. The composite material 10 is composed of many individual popped kernels of corn 20 covered with resin and cement powder. The wall unit may be used as either an internal or external non-load bearing wall. The wall units are not used as load bearing walls. The sidewalls 12 can be constructed to any shape or size. It is contemplated that the wall unit may have varied dimensions, however, four feet in width and eight feet in height is ideal. Further, the material used to construct the sidewalls 12 may vary. It is contemplated that potential materials used for the sidewalls include polyester laminate, aluminum, wood, plastic, dry wall and alternative forms of rigid substances. Further, a user may desire to use a laminate of three layers of the solid sidewall 12 and two layers of the popcorn based construction material 10. However, a person skilled in the art may contemplate the use of alternative materials. In addition, a tube-like structure 14 such as a PVC conduit may be inserted in the middle of the popcorn based composite construction material 10 so as to provide easy installation of utility mechanisms needed in a building. It is also further contemplated that for increased strength, traditional re-bar reinforcement may be inserted through the popcorn based composite construction material 10.

Figure 2:
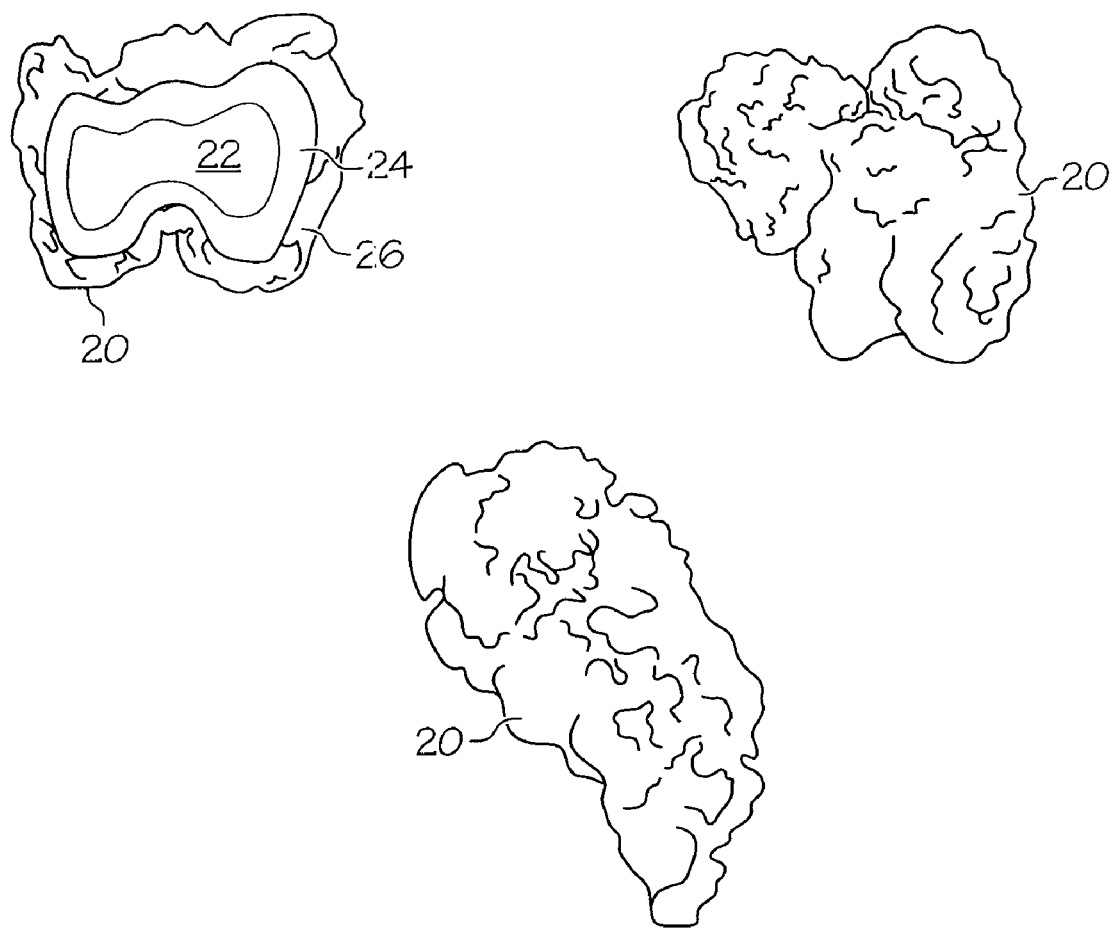
FIG. 2 shows an enlarged perspective view of individual pieces of the popcorn composite that have undergone the process to become suitable for building construction.

In reference to FIG. 2, an enlarged view of individual pieces of popped kernels of corn 20 that have undergone the process to become suitable for building construction is shown. Each popped kernel of corn 20 is combined with many other pieces to produce the composite material suitable for building construction.

The popcorn based construction material 10 is produced by first popping a large amount of ordinary popcorn kernels 22 through using any device by which the popcorn may be popped. The popcorn is then coated with a resin solution. The type of resin used must be fire retardant. It is contemplated that a particular type of resin used is the ADVACO 4510 MVP Class 1 Fire Retardant resin. The solution will consist of about 60% resin and about 40% thinning agent, such as acetone. The moistened popped kernels are allowed to drip and are then powder coated. The powder coating 24 used is most likely cement powder, however bauxite may be used as well. The powder coated popped kernels are allowed to dry and harden and are then dipped in a resin solution 26 consisting of nearly 100% resin. The thicker solution 26 will not drip off the kernels and will form an impermeable barrier over the kernels of corn. The resin coated popcorn 20 is then placed inside a mold. The mold may be any shape necessary for construction. A rigid sidewall panel 12 is first placed inside the mold and the coated kernels are placed on top of the panel. A second sidewall panel 12 is then placed on top of the coated kernels. When the popcorn is in the mold it is vibrated so as to make sure the popcorn pieces settle properly and increase the density of the popcorn based composite construction material 10. The popcorn composite is then left to dry and harden. When dried, the popcorn based composite construction material 10 and sidewalls 12 are removed from the mold.

An alternative method of creating the popcorn based composite construction material 10 is to combine cement powder with the resin or similar material before applying it to the popped kernels of corn. This acts as a binding agent and increases the strength of the popcorn based construction material 10 once it has dried.

A further alternative method of creating the popcorn based construction material 10 is to first pop the kernels of corn. Then the popped kernels of corn are quickly dipped in a liquid and allowed to moisten. Any liquid will be effective to moisten the popped kernels of corn. It is contemplated that a solution of resin and thinning agent will be ideal. Immediately after being removed from the liquid, the popcorn is powder coated with dry powder such as cement powder or bauxite powder. However, it is contemplated that any powder that will bind together will be effective. This powder coating will stop the popcorn from dissolving and shrinking in size. Following the powder coating, the popcorn is coated with resin or similar material and placed in the mold. The mold is vibrated and the popcorn based construction material 10 is allowed to dry and harden. Because the resin coats the popcorn based construction material 10, water or moisture will not affect the structural integrity and strength of the popcorn based construction material 10. Further, the resin prevents intrusion by insects or rodents. Further still, when the popcorn based construction material 10 settles and dries, pockets of air remain and there is not a solid density throughout. Therefore, the popcorn based construction material 10 acts as natural insulation for any structure.

Example

An example of the amounts and ingredients used is explained as follows. The following amounts are used to compose a panel of 1 ft² in surface area and 1 inch in thickness. The first step requires the user to pop 6.5 ounces of corn. The popped kernels of corn are then coated with a liquid solution. The solution is a combination of 15 ounces of resin and 1.5 ounces of a thinning agent such as acetone. The solution is allowed to drip off of the popped kernels and the moist kernels are powder coated with approximately 19 ounces of dry cement powder. The powder is allowed to dry and harden.

The second step requires the dried and hardened powder coated kernels of corn to be coated with a second layer of resin. The second layer of resin is a mixture that consists of 25.5 ounces of resin and 1.8 ounces of cement mixed into the resin. This second layer of resin is allowed to dry and harden.

The sidewalls used in the example may be constructed of the following ingredients. For each side of the 1 ft² panel, the user applies 18 ounces of resin, 10.5 ounces of fiberglass, and 1.5 ounces of a gel coat.

As shown in FIG. 1, wall panels 12 can be created in order to construct entire walls, wall panels, partitions or roof panels of a structure having inside and outside facing sides. A layer of synthetic material is laid onto the interior of a mold. This layer will compose the outer facing wall 12. After this is placed within the mold, the popcorn based composite construction material 10 is placed over the synthetic material and allowed to dry. A second layer of synthetic material is then placed on top of the popcorn based construction material 10. This second layer will be the interior facing wall 12.

The outer facing surfaces of the walls 12 may be produced with a transparent or colored gel coating, such as acrylic or a similar material. Then a user prints a fleece lay out with a transparent gel coat or a similar material. The user then coats the back of the surface with a colored gel coating. The surface is then laminated with glassmat and resin material. Ideally, the laminate layer has a thickness between 3 to 5 millimeters or more.

The center and back facing wall 12 surfaces may be composed of resin mixed with cement or a similar material. This is a layer having a thickness between 2 and 4 millimeters. Once the surfaces are complete, they are assembled to create a wall or panel with the popcorn based construction material 10 between the sidewalls 12. The sidewall 12 surfaces or panels are then vacuum sealed for structural rigidity and impermeability.

Figure 3:
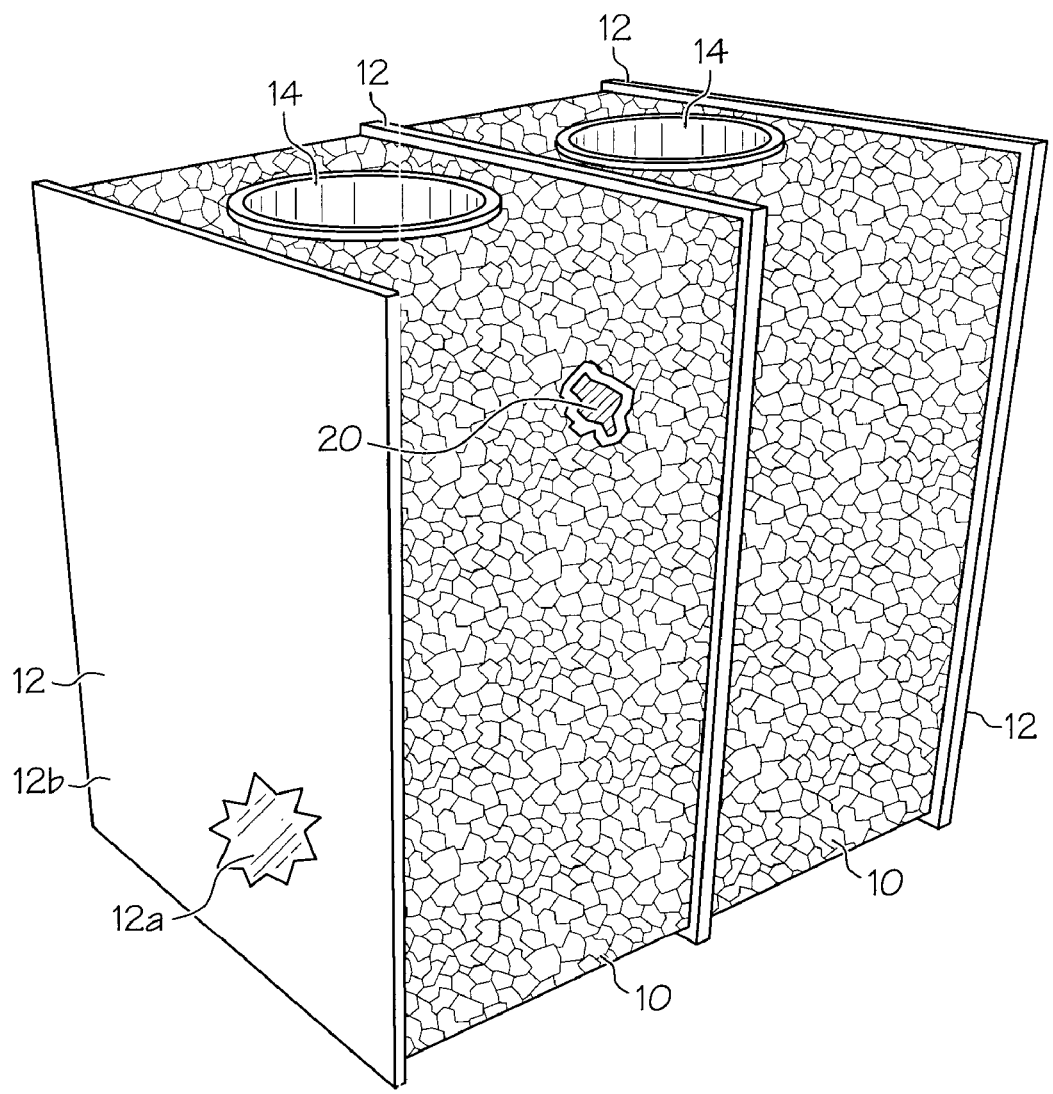
FIG. 3 shows a perspective view of the popcorn based construction material constructed with two sections of popcorn between three sidewalls.

As shown in FIG. 3, in an alternate embodiment, a second layer of popcorn based composite construction material 10 may be placed on top of the interior facing sidewall 12 and a third sidewall 12 can be placed on the second layer of popcorn based construction material 10. This can be continued for as many layers as the user desires.

This structure has been wind tested and is capable of withstanding 160 mph winds without structural failure. In addition, the popcorn based construction material 10 has a density less than the density of water and thus, will float if required to do so.

Also, if desired, it is contemplated that the popcorn based construction material 10 may be used as a substitute for concrete in all projects in which concrete is used. Often projects require lightweight material and concrete is heavy. A trend toward lightweight concrete has arisen recently. A user may simply use the above described material 10 for these projects. When using the material 10 as a substitute for concrete, the sidewalls 12 are used only when required.

As a further alternative, after the individual kernels of popcorn 20 have been dipped in a liquid and powder coated, they will be coated in resin and allowed to dry and harden individually outside of a mold structure. Once hardened, the kernels 20 are mixed into a solution of cement or similar material, such as plaster. Cement typically mixes with sand, water and gravel. Instead of adding gravel to the solution, the user will add the hardened kernels of popcorn 20. This substitution will make the cement, or similar material, lighter, but will maintain the strength.

The composite material described herein can be molded to provide flat or curved building non-load bearing walls, panels, wall sections, partitions and roof sections. A building made of walls using the composite popcorn materials would have a separate vertical support structure made of concrete columns, wooden poles or welded I-beams used in multiple story buildings. The composite popcorn walls are filled between the vertical structure members or roof structure members and are fastened thereto with conventional fasteners such as nails or screws or laminated thereto with epoxies or glues. Wall studs could also be used for support of panels molded of the composite materials.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A rigid, popcorn based composite construction material to be used as interior or exterior non-load bearing walls comprising:
    a plurality of popped kernels of corn, each popped kernel of corn covered in a laminate of layers;
    a first laminate layer of a moistening solution comprising a resin and a liquid thinning agent, said moistening solution covering the surface of each of the popped kernels of corn;
    a second laminate layer of a dry, binding and hardening powder, the moistened popped kernels of corn being coated with said powder; and
    a third laminate layer of an impermeable and adhesive coating, comprising a resin, said impermeable and adhesive resin covering each of the powder coated popped kernels of corn, the powder coated popped kernels of corn adhesively positioned together to form a rigid composite construction material.

2. The popcorn based composite construction material described in claim 1, wherein the second layer powder is mixed with the first layer moistening solution laminate layer before the moistening solution is applied to the popped kernels of corn as the first layer.

3. The popcorn based composite construction material described in claim 1 wherein the resin used in the moistening solution and in the coating is non-flammable.

4. The popcorn based composite construction material described in claim 1, wherein the thinning agent is acetone.

5. The popcorn based composite construction material described in claim 1, wherein the powder is cement powder.

6. The popcorn based composite construction material described in claim 1, further comprising structurally rigid outwardly facing and inwardly facing first and second side walls between which the popcorn based construction material is sealably attached to and contained within;
    said first and second side walls being dry wall panels.

7. A rigid, popcorn based composite construction material to be used as interior or exterior non-load bearing walls comprising:
    a pair of parallel side walls;
    a plurality of popped kernels of corn;
        each popped kernel covered by a first layer of a moistening solution comprising a resin and a liquid thinning agent, wherein said moistening solution is applied to the surface of each of the popped kernels of corn;
        each popped kernel covered by a second layer of a dry, binding mad hardening powder, wherein the surface of each moistened popped kernel of corn is coated with said powder;
        each popped kernel covered by a third layer of an impermeable and adhesive coating, comprising a resin, wherein said coating is applied onto the surface of each individual powder coated popped kernels of corn; and
    said coated popped kernels connected together between said side wails.

8. The popcorn based composite construction material described in claim 7, wherein the powder is cement powder.

9. The popcorn based composite construction material described in claim 7, wherein the thinning agent is acetone.

10. The popcorn based composite construction material described in claim 7, further comprising structurally rigid outwardly facing and inwardly facing side walls between which the popcorn based construction material is sealably attached to and contained within, said side walls made of dry wall panels.

11. The popcorn based composite construction material described in claim 7, wherein a 1 ft$^2$×2 in. portion of said popcorn based construction material consists of 6.5 oz popped kernels of corn, 15 oz of resin to be used in the moistening solution, 1.5 oz of thinning agent, 19 oz of powder, a further 25.5 oz of resin to be used in the coating, and a further 1.8 oz of powder after the coating is applied.

* * * * *